United States Patent [19]
Wrisberg

[11] Patent Number: 5,688,445
[45] Date of Patent: Nov. 18, 1997

[54] DISTRIBUTOR MEANS AND METHOD

[75] Inventor: Johannes Wrisberg, Holte, Denmark

[73] Assignee: Haldor Topsoe A/S, Lyngby, Denmark

[21] Appl. No.: 509,323

[22] Filed: Jul. 31, 1995

[51] Int. Cl.$^6$ .................................................. B01F 3/04
[52] U.S. Cl. .................................... 261/96; 261/97
[58] Field of Search .................................. 261/97, 96

[56] References Cited

U.S. PATENT DOCUMENTS

| | | | |
|---|---|---|---|
| 3,446,489 | 5/1969 | Leva | 261/97 |
| 4,427,605 | 1/1984 | Meier et al. | 261/97 |
| 4,462,966 | 7/1984 | Stynes | 422/220 |
| 4,557,877 | 12/1985 | Hofstetter | 261/97 |
| 4,708,852 | 11/1987 | Helbling, Jr. et al. | 422/220 |
| 4,836,989 | 6/1989 | Aly et al. | 261/97 |
| 5,484,578 | 1/1996 | Muldowney et al. | 261/97 |

FOREIGN PATENT DOCUMENTS

WO90/14879  12/1990  WIPO ................................. 261/97

*Primary Examiner*—Tim R. Miles
*Attorney, Agent, or Firm*—Ostrolenk, Faber, Gerb & Soffen, LLP

[57] ABSTRACT

A distributor for supplying a mixed phase flow of gas-liquid feed uniformly on the surface of a trickle-bed of solid particles, including a tray horizontally arranged above the surface of the trickle-bed. The tray is equipped with a plurality of open-ended tubular distributor downcomers of a predetermined tube diameter and extend vertically for a certain height above and below the tray. The downcomers are adapted to provide passage for liquid flow through horizontal aperture in the tube wall of the downcomers and to provide passage for gas flow through the open ends of the downcomers. The apertures are disposed in the tube walls at various elevations above the tray with a predetermined minimum elevation for maintaining a liquid level on the tray.

3 Claims, 1 Drawing Sheet

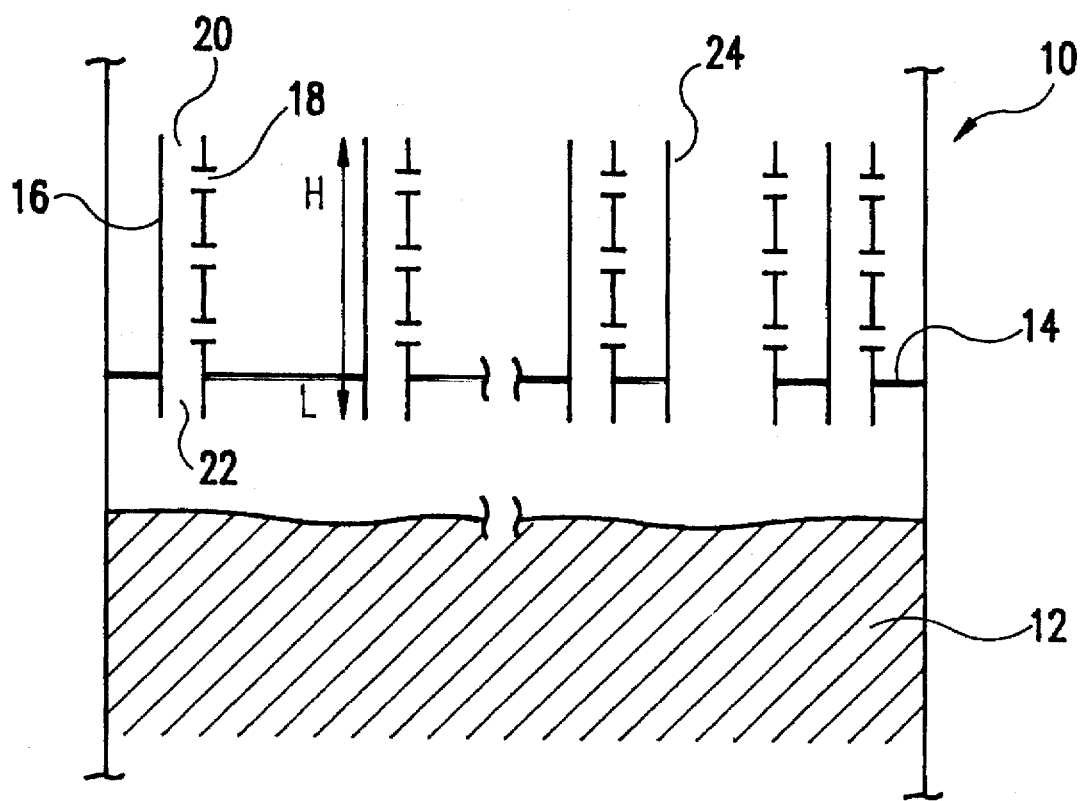

5,688,445

DISTRIBUTOR MEANS AND METHOD

BACKGROUND OF THE INVENTION

1. Field of the Invention

The present invention relates to means for uniform distribution of a gas-liquid mixed phase on the surface of solid particles disposed in a trickle-bed.

2. Description of the Related Art

Trickle-bed reactors are conventionally employed during hydroprocessing of hydrocarbon feed. By application of a downward flow of a mixed gas-liquid feed consisting most usually of hydrogen and liquid oil products, a stream of the liquid feed flows in the trickle-bed reactor as a continuous film over solid catalyst particles and reacts with gas passing in parallel flow with the liquid stream.

Because of high importance of the uniform flow of the gas-liquid stream on the performance of the trickle-bed reactor, a uniform distribution of the feed on the surface of the catalyst bed is necessary to obtain uniform flow within the catalyst bed. Uneven flow distribution results in undesired flow variation within the bed and non-optimal catalyst utilization.

A number of methods are applied in industrial trickle-bed reactors to distribute mixed gas-liquid feed uniformly on top of the bed, including distribution through spray heads or spray nozzles or by trays with a plurality of distribution elements.

Various proposals for improved distribution of gas-liquid feed to a fixed bed of catalyst particles have additionally been made in the patent literature.

U.S. Pat. No. 4,462,966 discloses a fluid distributor with a vertically disposed fluid inlet tube, which terminates in a number of radially-disposed tubes, and an annular tray mounted below the radially-disposed tubes. The bottom of the tray is provided with a plurality of flow passages. Liquid being discharged from the radial tubes on the surface of the tray is, thereby, distributed downwardly through the passages over the surface of catalyst particles.

A corrugated distributor tray is disclosed in U.S. Pat. No. 4,708,852. The shown tray is provided with perforations in valleys and peaks of the corrugated structure. The perforations in the valleys have a size to provide liquid pools in the valleys at a minimum flow rate of liquid. Gas is distributed through the perforations in the peaks.

In the known distributor trays levelling of the trays is critical and variations in quantity of feed flow supplied to the tray may lead to uneven distribution of liquid passing through the passages in the tray.

It is thus the general object of this invention to provide improved distributor means for distributing a flow of gas-liquid mixed phase uniformly to a subsequent trickle-bed of solid catalyst particles even at large variations in feed load.

SUMMARY OF THE INVENTION

Accordingly, the invention provides distributor means for supplying a mixed phase of gas-liquid feed uniformly on the surface of a trickle-bed of solid particles, comprising a tray horizontally arranged above the surface of the trickle-bed;

the tray being equipped with a plurality of open ended tubular distributor downcomers of a predetermined tube diameter and extending vertically for a certain height above and below the tray, wherein the downcomers are adapted to provide passage for liquid flow through horizontal apertures in the tube wall of the downcomers and to provide passage for gas flow through the open ends of the downcomers;

the apertures being disposed in the tube wall at different elevations above the tray with a predetermined minimum elevation for maintaining a liquid level on the tray.

The number and dimensions of downcomers depend on the actual rate of gas and liquid flow introduced on the tray. In general, the height of the downcomers above the tray is at least 200 mm to allow for varying liquid load without overflow of liquid through the open ends of the downcomers. The downcomers are typically disposed in the tray with a pitch of about 50–120 mm.

Horizontal apertures in the downcomers are typically disposed at 3–4 elevations at a minimum elevation of about 50 mm above the bottom of the tray and at intervals of 30–40 mm between each aperture, which ensures high flexibility at turn-down of the trickle-bed reactor. The diameter of the apertures is selected to maintain a liquid level on the tray of about 150–190 mm at 125% of liquid load. Preferably, the diameter of the apertures is at least 4 mm.

As an important feature of the invention, the inner diameter of the downcomers is adjusted to provide a Froude number of below 0.35. The Froude number is defined as follows:

$$N_F = \frac{v}{\sqrt{g \cdot D}} < 0.35$$

wherein $N_F$ is Froude's number;

v is superficial liquid velocity in the downcomers, m/s;

D is the inner tube diameter; and g is acceleration of gravity, 9.81 m/s²

At a Froude number of below 0.35, it is ensured that the downcomers are not partially floated, which otherwise will result in an uneven flow distribution between the downcomers and fluctuations in velocity head loss at a varying degree of flooding.

In a further embodiment of the invention, the tray is additionally equipped with a number of open ended tubular gas chimneys extending vertically for a certain height above and below the tray. The gas chimneys have an inner diameter, which is larger than that of the downcomers, preferably, at least 2 times the diameter of the downcomers. The gas chimney may, furthermore, be provided with apertures of the same diameter and at the same elevations as the apertures in the downcomers.

The above features and aspects of the invention will become more apparent from the following description and the drawing, illustrating distributor means according to a specific embodiment of the inventive.

BRIEF DESCRIPTION OF THE DRAWINGS

In the drawing, the sole FIGURE is a cross-sectional view of a distributor according to the invention installed in a cylindrical reactor vessel provided with a trickle-bed of solid catalyst particles.

DETAILED DESCRIPTION OF THE PREFERRED EMBODIMENTS

Referring to the FIGURE, a trickle-bed reactor 10 including a trickle-bed 12 with solid catalyst particles has distributor means in the form of an annular tray 14 fastened to the wall of reactor 10. Tray 14 is arranged in reactor 10 upstream and spaced apart from bed 12. The tray is provided with a number of downcomers 16. Downcomers 16 are vertically disposed in tray 14 extending for a length L below plate 14 and having a height H above the bottom of tray 14. Downcomers 16 have open inlet ends 20 and outlet ends 22 and are provided with horizontal apertures arranged vertically aligned in the downcomers at different elevations above the bottom of tray 14. The lowest elevation of apertures 18 is at a predetermined distance from the bottom of tray 14 in order to provide a liquid pool on the tray.

A flow of a mixed liquid-gas feed is introduced into reactor 10 by conventional inlet means (not shown).

Gas in the mixed feed passes mainly through open ends 20 and 22 in downcomers 16 to catalyst bed 12. The liquid phase is floated on tray 14. When a liquid level corresponding to the elevations of apertures 18 is reached, the liquid passes through corresponding apertures and to open outlet ends 22 in the downcomers and is distributed evenly onto the surface of bed 12. Tray 14 is equipped with a number of gas chimneys 24.

At a higher liquid load, passage of liquid is additionally provided through apertures at higher elevations above the bottom of tray 14.

EXAMPLE

Two different distribution trays were tested by measuring liquid flow and number of velocity heads at different liquid loads on the trays.

A first distribution tray (A) was equipped with a single downcomer having the following design parameters:

| | |
|---|---|
| Inner diameter (mm) | 9.00 |
| Downcomer Area (mm$^2$) | 63.62 |
| Diameter of Apertures (mm) | 4.60 |
| Area of Apertures (mm$^2$) | 16.62 |
| Elevation of Apertures (mm) | |
| Aperture 1 | 50 |
| Aperture 2 | 80 |
| Aperture 3 | 110 |
| Aperture 4 | 140 |

A second distributor tray (B) was equipped with a single downcomer with the following design parameters:

| | |
|---|---|
| Inner diameter (mm) | 25.00 |
| Downcomer Area (mm$^2$) | 490.87 |
| Diameter of Apertures (mm) | 4.60 |
| Area of Apertures (mm$^2$) | 16.62 |
| Elevation of Apertures (mm) | |
| Aperture 1 | 48 |
| Aperture 2 | 78 |
| Aperture 3 | 108 |
| Aperture 4 | 138 |

The trays were floated with increasing amounts of liquid and the liquid flow, Froude number and number of velocity heads were determined.

The results obtained with tray A and tray B are summarized below in Table 1 and Table 2, respectively.

TABLE 1

Tray A

| Liquid Height above tray (mm) | Liquid Flow (mm**3/h) | Froude Number | Number of Velocity Heads |
|---|---|---|---|
| 59 | 0.022 | 0.32 | 1.31 |
| 63 | 0.024 | 0.35 | 1.59 |
| 63 | 0.024 | 0.35 | 1.59 |
| 65 | 0.027 | 0.40 | 1.45 |
| 75 | 0.032 | 0.47 | 1.71 |
| 75 | 0.033 | 0.48 | 1.61 |
| 87 | 0.053 | 0.78 | 1.90 |
| 95 | 0.072 | 1.06 | 1.52 |
| 120 | 0.127 | 1.87 | 1.39 |
| 130 | 0.132 | 1.94 | 1.69 |
| 135 | 0.130 | 1.91 | 1.95 |
| 164 | 0.218 | 3.20 | 1.52 |
| 180 | 0.243 | 3.57 | 1.55 |
| 190 | 0.259 | 3.81 | 1.54 |
| Mean value of number of velocity heads: | | | 1.59 |
| Standard deviation: | | | 0.18 |

TABLE 2

Tray B

| Liquid Height above tray (mm) | Liquid Flow (mm**31h) | Froude Number | Number of velocity Heads |
|---|---|---|---|
| 59 | 0.023 | 0.03 | 1.46 |
| 61 | 0.024 | 0.03 | 1.59 |
| 68 | 0.031 | 0.04 | 1.46 |
| 85 | 0.053 | 0.06 | 1.90 |
| 91 | 0.073 | 0.08 | 1.36 |
| 99 | 0.081 | 0.09 | 1.47 |
| 106 | 0.090 | 0.10 | 1.44 |
| 122 | 0.136 | 0.16 | 1.37 |
| 122 | 0.133 | 0.15 | 1.43 |
| 124 | 0.134 | 0.15 | 1.49 |
| 133 | 0.157 | 0.18 | 1.33 |
| 142 | 0.180 | 0.21 | 1.41 |
| 146 | 0.190 | 0.22 | 1.43 |
| 160 | 0.223 | 0.25 | 1.40 |
| 186 | 0.269 | 0.31 | 1.39 |
| Mean value of number of velocity heads: | | | 1.46 |
| Standard deviation: | | | 0.14 |

As apparent from the above Tables fluctuations of velocity head at varying loads of the trays expressed as standard deviation (s) of the mean number of velocity heads ($\bar{x}$), is considerably lower when the Froude number of the downcomers is in accordance with a specific embodiment of the invention below 0.35.

I claim:

1. Distributor means for supplying a mixed phase flow of gas-liquid feed uniformly on a surface of a trickle-bed of solid particles, comprising:

a tray horizontally arranged above the surface of the trickle-bed; and a plurality of identical tubular distributor downcomers disposed on the tray, the downcomers having open upper ends for passage of gas flow, horizontal apertures in the walls thereof for passage of liquid flow, the apertures being disposed in the tube walls at different elevations above the tray with a predetermined minimum elevation for maintaining a liquid level on the tray, and open outlet ends for distribution of the liquid onto the surface of the trickle-bed, the downcomers further having a predetermined tube diameter relative to the liquid flow that satisfies the relationship:

$$N_F = \frac{v}{\sqrt{g \cdot D}} < 0.35$$

wherein $N_F$ is Froude's number;

v is the superficial liquid velocity in the downcomers, m/s;

D is the inner tube diameter; and g is the acceleration due to gravity, 9.81 m/s²;

said tray being further equipped with at least one tubular gas chimney extending vertically above and below the tray, the diameter of said chimneys being at least twice that of said downcomers.

2. Distributor means according to claim 1, wherein the chimney is provided with horizontal apertures for passage of the liquid flow.

3. A method of supplying a mixed phase flow of a gas-liquid feed uniformly on a surface of a trickle-bed of solid particles using a distributor means having a tray horizontally arranged above the surface of a trickle-bed, the tray having a plurality of identical tubular distributor downcomers disposed on the tray, the downcomers having open ends for passage of gas flow, horizontal apertures in the walls thereof for passage of liquid flow, the apertures being disposed in the tube walls at different elevations above the tray with a predetermined minimum elevation for maintaining a liquid level on the tray, and open outlet ends for distribution of the liquid onto the surface of the trickle-bed, the downcomers further having a predetermined tube diameter relative to the liquid flow that satisfies the relationship:

$$N_F = \frac{v}{\sqrt{g \cdot D}} < 0.35$$

wherein $N_F$ is Froude's number;

v is the superficial liquid velocity in the downcomers, m/s;

D is the inner tube diameter; and g is the acceleration due to gravity, 9.81 m/s², the method comprising the steps of:

passing a gas flow down through the open ends of the downcomers; and passing a liquid flow through the horizontal apertures of the downcomers simultaneously with the gas flow through the open ends of the downcomers.

* * * * *